United States Patent
Henry et al.

(10) Patent No.: US 7,155,598 B2
(45) Date of Patent: Dec. 26, 2006

(54) APPARATUS AND METHOD FOR CONDITIONAL INSTRUCTION EXECUTION

(75) Inventors: G. Glenn Henry, Austin, TX (US); Rodney E. Hooker, Austin, TX (US); Terry Parks, Austin, TX (US)

(73) Assignee: IP-First, LLC, Fremont, CA (US)

( * ) Notice: Subject to any disclaimer, the term of this patent is extended or adjusted under 35 U.S.C. 154(b) by 600 days.

(21) Appl. No.: 10/144,592

(22) Filed: May 9, 2002

(65) Prior Publication Data

US 2003/0188140 A1 Oct. 2, 2003

Related U.S. Application Data

(60) Provisional application No. 60/369,570, filed on Apr. 2, 2002.

(51) Int. Cl.
G06F 9/38 (2006.01)

(52) U.S. Cl. .................... 712/226; 712/219
(58) Field of Classification Search ............ 712/226, 712/209, 212, 219, 234; 711/108, 102
See application file for complete search history.

(56) References Cited

U.S. PATENT DOCUMENTS

| | | | |
|---|---|---|---|
| 5,875,342 A | 2/1999 | Temple | |
| 5,937,199 A | 8/1999 | Temple | |
| 6,058,472 A | 5/2000 | Panwar et al. | |
| 6,157,996 A * | 12/2000 | Christie et al. | 712/218 |
| 6,199,155 B1 * | 3/2001 | Kishida et al. | 712/210 |
| 6,230,259 B1 * | 5/2001 | Christie et al. | 712/228 |
| 6,351,806 B1 | 2/2002 | Wyland | |
| 6,434,693 B1 | 8/2002 | Senter et al. | |
| 6,456,891 B1 * | 9/2002 | Kranich et al. | 700/2 |
| 6,549,999 B1 | 4/2003 | Kishida et al. | |
| 6,647,488 B1 | 11/2003 | Takeno et al. | |

OTHER PUBLICATIONS

U.S. Appl. No. 60/369,586.*
Haitham Akkary; Memory System for Ordering Load and Store Instructions in a Processor That Performs Out–of–Order Multithread Execution; US2002/0194457; Dec. 9, 2002.

* cited by examiner

Primary Examiner—Henry W. H. Tsai
(74) Attorney, Agent, or Firm—Richard K. Huffman; James W. Huffman (57) ABSTRACT

A conditional execution apparatus in a microprocessor is provided. The conditional execution apparatus includes translation logic and extended execution logic. The translation logic translates an extended instruction into corresponding micro instructions. The extended instruction has and extended prefix and an extended prefix tag. The extended prefix specifies a condition, where execution of an operation prescribed by the extended instruction depends upon realization of the condition. The extended prefix tag indicates the extended prefix, where the extended prefix tag is an otherwise architecturally specified opcode within an instruction set for the microprocessor. The extended execution logic is coupled to the translation logic. The extended execution logic receives the corresponding micro instructions, and evaluates the condition. If the condition is not realized, then the extended execution logic precludes execution of the operation.

37 Claims, 7 Drawing Sheets

*Extended Prefix for Conditional Execution* ← 600

| 7 | 601 | 4 3 | 602 | 0 |
|---|---|---|---|---|
| | SPARE | | CONDITION | |

*Condition Field Logic States* ← 700

| STATE | CONDITION |
|---|---|
| 0000 | OVERFLOW |
| 0001 | NOT OVERFLOW |
| 0010 | CARRY |
| 0011 | NOT CARRY |
| 0100 | ZERO |
| 0101 | NOT ZERO |
| 0110 | NOT ABOVE |
| 0111 | NOT BELOW OR EQUAL |
| 1000 | SIGN |
| 1001 | NOT SIGN |
| 1010 | PARITY EVEN |
| 1011 | PARITY ODD |
| 1100 | NOT GREATER OR EQUAL |
| 1101 | GREATER OR EQUAL |
| 1110 | NOT GREATER |
| 1111 | GREATER |

*Fig. 1 (Related Art)*

*Microprocessor Instruction Format*

*Fig. 2 (Related Art)*

*8-Bit Opcode Map*

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | I00 | I01 | I02 | I03 | I04 | I05 | I06 | I07 | I08 | I09 | I0A | I0B | I0C | I0D | I0E | I0F |
| 1 | I10 | I11 | I12 | I13 | I14 | I15 | I16 | I17 | I18 | I19 | I1A | I1B | I1C | I1D | I1E | I1F |
| 2 | I20 | I21 | I22 | I23 | I24 | I25 | I26 | I27 | I28 | I29 | I2A | I2B | I2C | I2D | I2E | I2F |
| 3 | I30 | I31 | I32 | I33 | I34 | I35 | I36 | I37 | I38 | I39 | I3A | I3B | I3C | I3D | I3E | I3F |
| 4 | I40 | I41 | I42 | I43 | I44 | I45 | I46 | I47 | I48 | I49 | I4A | I4B | I4C | I4D | I4E | I4F |
| 5 | I50 | I51 | I52 | I53 | I54 | I55 | I56 | I57 | I58 | I59 | I5A | I5B | I5C | I5D | I5E | I5F |
| 6 | I60 | I61 | I62 | I63 | I64 | I65 | I66 | I67 | I68 | I69 | I6A | I6B | I6C | I6D | I6E | I6F |
| 7 | I70 | I71 | I72 | I73 | I74 | I75 | I76 | I77 | I78 | I79 | I7A | I7B | I7C | I7D | I7E | I7F |
| 8 | I80 | I81 | I82 | I83 | I84 | I85 | I86 | I87 | I88 | I89 | I8A | I8B | I8C | I8D | I8E | I8F |
| 9 | I90 | I91 | I92 | I93 | I94 | I95 | I96 | I97 | I98 | I99 | I9A | I9B | I9C | I9D | I9E | I9F |
| A | IA0 | IA1 | IA2 | IA3 | IA4 | IA5 | IA6 | IA7 | IA8 | IA9 | IAA | IAB | IAC | IAD | IAE | IAF |
| B | IB0 | IB1 | IB2 | IB3 | IB4 | IB5 | IB6 | IB7 | IB8 | IB9 | IBA | IBB | IBC | IBD | IBE | IBF |
| C | IC0 | IC1 | IC2 | IC3 | IC4 | IC5 | IC6 | IC7 | IC8 | IC9 | ICA | ICB | ICC | ICD | ICE | ICF |
| D | ID0 | ID1 | ID2 | ID3 | ID4 | ID5 | ID6 | ID7 | ID8 | ID9 | IDA | IDB | IDC | IDD | IDE | IDF |
| E | IE0 | IE1 | IE2 | IE3 | IE4 | IE5 | IE6 | IE7 | IE8 | IE9 | IEA | IEB | IEC | IED | IEE | IEF |
| F | IF0 | IF1 | IF2 | IF3 | IF4 | IF5 | IF6 | IF7 | IF8 | IF9 | IFA | IFB | IFC | IFD | IFE | IFF |

Fig. 3

*Extended Instruction Format*

Fig. 4

*8-Bit Extended Prefix Map*

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | E00 | E01 | E02 | E03 | E04 | E05 | E06 | E07 | E08 | E09 | E0A | E0B | E0C | E0D | E0E | E0F |
| 1 | E10 | E11 | E12 | E13 | E14 | E15 | E16 | E17 | E18 | E19 | E1A | E1B | E1C | E1D | E1E | E1F |
| 2 | E20 | E21 | E22 | E23 | E24 | E25 | E26 | E27 | E28 | E29 | E2A | E2B | E2C | E2D | E2E | E2F |
| 3 | E30 | E31 | E32 | E33 | E34 | E35 | E36 | E37 | E38 | E39 | E3A | E3B | E3C | E3D | E3E | E3F |
| 4 | E40 | E41 | E42 | E43 | E44 | E45 | E46 | E47 | E48 | E49 | E4A | E4B | E4C | E4D | E4E | E4F |
| 5 | E50 | E51 | E52 | E53 | E54 | E55 | E56 | E57 | E58 | E59 | E5A | E5B | E5C | E5D | E5E | E5F |
| 6 | E60 | E61 | E62 | E63 | E64 | E65 | E66 | E67 | E68 | E69 | E6A | E6B | E6C | E6D | E6E | E6F |
| 7 | E70 | E71 | E72 | E73 | E74 | E75 | E76 | E77 | E78 | E79 | E7A | E7B | E7C | E7D | E7E | E7F |
| 8 | E80 | E81 | E82 | E83 | E84 | E85 | E86 | E87 | E88 | E89 | E8A | E8B | E8C | E8D | E8E | E8F |
| 9 | E90 | E91 | E92 | E93 | E94 | E95 | E96 | E97 | E98 | E99 | E9A | E9B | E9C | E9D | E9E | E9F |
| A | EA0 | EA1 | EA2 | EA3 | EA4 | EA5 | EA6 | EA7 | EA8 | EA9 | EAA | EAB | EAC | EAD | EAE | EAF |
| B | EB0 | EB1 | EB2 | EB3 | EB4 | EB5 | EB6 | EB7 | EB8 | EB9 | EBA | EBB | EBC | EBD | EBE | EBF |
| C | EC0 | EC1 | EC2 | EC3 | EC4 | EC5 | EC6 | EC7 | EC8 | EC9 | ECA | ECB | ECC | ECD | ECE | ECF |
| D | ED0 | ED1 | ED2 | ED3 | ED4 | ED5 | ED6 | ED7 | ED8 | ED9 | EDA | EDB | EDC | EDD | EDE | EDF |
| E | EE0 | EE1 | EE2 | EE3 | EE4 | EE5 | EE6 | EE7 | EE8 | EE9 | EEA | EEB | EEC | EED | EEE | EEF |
| F | EF0 | EF1 | EF2 | EF3 | EF4 | EF5 | EF6 | EF7 | EF8 | EF9 | EFA | EFB | EFC | EFD | EFE | EFF |

*Extended Prefix for Conditional Execution* ⟵600

Fig. 7

*Condition Field Logic States* ⟵700

| STATE | CONDITION |
|-------|-----------|
| 0000  | OVERFLOW |
| 0001  | NOT OVERFLOW |
| 0010  | CARRY |
| 0011  | NOT CARRY |
| 0100  | ZERO |
| 0101  | NOT ZERO |
| 0110  | NOT ABOVE |
| 0111  | NOT BELOW OR EQUAL |
| 1000  | SIGN |
| 1001  | NOT SIGN |
| 1010  | PARITY EVEN |
| 1011  | PARITY ODD |
| 1100  | NOT GREATER OR EQUAL |
| 1101  | GREATER OR EQUAL |
| 1110  | NOT GREATER |
| 1111  | GREATER |

Fig. 8

Fig. 11
Extended Conditional Execution

APPARATUS AND METHOD FOR CONDITIONAL INSTRUCTION EXECUTION

CROSS-REFERENCE TO RELATED APPLICATIONS

This application claims priority based on U.S. Provisional Application, Ser. No. 60/369,570, filed Apr. 2, 2002, entitled "APPARATUS AND METHOD FOR CONDITIONAL INSTRUCTION EXECUTION."

This application is related to the following co-pending U.S. Patent Applications, which are filed on the same day as this application, and which have a common assignee and common inventors.

| | |
|---|---|
| 4,613,732 | 4,823,383 |
| 4,742,541 | 5,642,416 |
| 4,743,999 | 5,802,170 |

BACKGROUND OF THE INVENTION

1. Field of the Invention

This invention relates in general to the field of microelectronics, and more particularly to a technique for incorporating conditional execution capabilities into an existing microprocessor instruction set architecture.

2. Description of the Related Art

Since microprocessors were fielded in the early 1970's, their use has grown exponentially. Originally employed in the scientific and technical fields, microprocessor use has gravitated from those specialty fields into commercial consumer fields that include products such as desktop and laptop computers, video game controllers, and a host of other common household and business devices.

Along with this explosive growth in use over the past 30 years, the art has experienced a corresponding technology pull that is characterized by an escalating demand for increased speed, expanded addressing capabilities, faster memory accesses, larger operand size, more operations (e.g., floating point, single-instruction multiple data (SIMD), conditional moves, etc.), and added specialty operations (e.g., multi-media operations). This technology pull has resulted in an incredible number of advances in the art which have been incorporated in microprocessor designs such as extensive pipelining, super-scalar architectures, cache structures, out-of-order processing, burst access, branch predication, and speculative execution. Quite frankly, a present day microprocessor is an amazingly complex and capable machine in comparison to its 30-year-old predecessors.

But unlike many other products, there is another very important factor that has constrained, and continues to constrain, the evolution of microprocessor architecture. This factor, legacy compatibility, moreover accounts for a great deal of complexity in a present day microprocessor. For market-driven reasons, many producers have opted to incorporate new architectural features into updated microprocessor designs, but at the same time in these newer products they choose to retain all of the capabilities that are required to insure compatibility with older, so-called legacy application programs.

Nowhere has this legacy compatibility burden been more noticeable than can be seen in the development history of x86-compatible microprocessors. It is well known that a present day virtual-mode, 32-/16-bit x86 microprocessor is still capable of executing 8-bit, real-mode, application programs which were produced during the 1980's. And those skilled in the art will also acknowledge that a significant amount of corresponding architectural "baggage" is carried along in the x86 architecture for the sole purpose of supporting compatibility with legacy applications and operating modes. Yet, while in the past developers have been able to incorporate newly developed architectural features into existing instruction set architectures, the means whereby use of these features is enabled-programmable instructions-are becoming scarce. More succinctly, there are no more "spare" instructions in certain instruction sets of interest that provide designers with a means to incorporate newer features into an existing architecture.

In the x86 instruction set architecture, for example, there are no undefined 1-byte opcode states that have not already been used. All 256 opcode states in the primary 1-byte x86 opcode map are taken up with existing instructions. As a result, x86 microprocessor designers must presently make a choice between providing new features and abandoning legacy compatibility. If new programmable features are to be provided, then they must be assigned to opcode states. And if spare opcode states do not remain in an existing instruction set architecture, then some of the existing opcode states must be redefined to provide for the new features. Thus, legacy compatibility is sacrificed in order to provide for new feature growth.

One area of growth that is yet to be addressed in many instruction set architectures is known as conditional execution. Programmable conditional execution features allow a programmer to specify test conditions (e.g., greater than, less than, etc.) as part of an operative instruction (e.g., addition, subtraction, movement of operands from memory to registers, etc.). So programmed, a conditional instruction moves through a microprocessor pipeline, and immediately prior to execution of the operation specified by the conditional instruction, the test conditions are evaluated. If the conditions are true (i.e., realized), then the operation is performed, and results are generated. If the conditions are not false (i.e., not realized), then the operation is not performed and the conditional instruction is retired. Conditional execution capabilities would be extremely advantageous in a present day pipeline architecture because these capabilities would virtually eliminate the deep pipeline flushes that are now experienced as a consequence of branch mispredictions associated with conventional conditional branch instructions which are currently employed to effect conditional flow in application programs.

What is needed, therefore, is a technique that allows conditional execution features to be incorporated into an existing microprocessor instruction set architecture that has a completely populated opcode structure, and where the technique retains legacy application compatibility.

SUMMARY OF THE INVENTION

The present invention, among other applications, is directed to overcoming these and other problems and disadvantages of the prior art. The present invention provides a superior technique for extending a microprocessor instruction set beyond its current capabilities to provide comprehensive conditional execution features. In one embodiment, a conditional execution apparatus in a microprocessor is provided. The conditional execution apparatus includes translation logic and extended execution logic. The translation logic translates an extended instruction into corresponding micro instructions. The extended instruction has and extended prefix and an extended prefix tag. The extended prefix specifies a condition, where execution of an operation prescribed by the extended instruction depends upon realization of the condition. The extended prefix tag indicates the extended prefix, where the extended prefix tag is an otherwise architecturally specified opcode within an instruction set for the microprocessor. The extended execution logic is coupled to the translation logic. The extended execution logic receives the corresponding micro instructions, and evaluates the condition. If the condition is not realized, then the extended execution logic precludes execution of the operation.

One aspect of the present invention contemplates an extension mechanism, for adding conditional execution features to an existing microprocessor instruction set. The extension mechanism includes an extended instruction, a translator, and conditional execution control logic. The extended instruction specifies a subset of a plurality of condition codes upon which execution of a specified operation depends, where the extended instruction comprises one of the instructions in the existing microprocessor instruction set followed by an n-bit extended features prefix. The one of the instructions indicates the instruction extension and the n-bit extended features prefix indicates the subset. The translator receives the extended instruction, and generates a micro instruction sequence directing conditional execution of the specified operation according to the subset. The conditional execution control logic is coupled to the translator. The conditional execution control logic evaluates the condition codes corresponding to the subset, and executes the specified operation if the subset is realized.

Another aspect of the present invention comprehends an instruction set extension apparatus, for providing supplemental conditional execution capabilities to an existing microprocessor instruction set. The instruction set extension apparatus has an escape tag and a condition specifier. The escape tag is received by translation logic, and indicates that accompanying parts of a corresponding instruction prescribe an extended operation to be conditionally performed by a microprocessor, where the escape tag is a first opcode entity within the existing microprocessor instruction set. The condition specifier is coupled to the escape tag and is one of the accompanying parts. The condition specifier prescribes a condition codes state, upon which performance of the extended operation depends. The condition codes state is provided to conditional execution control logic, where the conditional execution control logic enables/disables performance of the extended operation.

A further aspect of the present invention provides a method for extending a microprocessor instruction set to provide programmable conditional execution capabilities. The method includes providing an extended instruction, the extended instruction including an extended tag along with a condition specifier prefix, where the extended tag is one of the opcodes in the microprocessor instruction set; prescribing, via the condition specifier prefix and remaining parts of the extended instruction, an operation to be executed, where execution of the operation depends upon realization of a condition specified by the condition specifier prefix; and evaluating condition code entities to determine whether or not the condition is realized and, if the condition is realized, executing the operation and, if the condition is not realized, precluding the executing.

BRIEF DESCRIPTION OF THE DRAWINGS

These and other objects, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles discussed herein may be applied to other embodiments. Therefore, the present invention is not intended to be limited to the particular embodiments shown and described herein, but is to be accorded the widest scope consistent with the principles and novel features herein disclosed.

Figure 1:
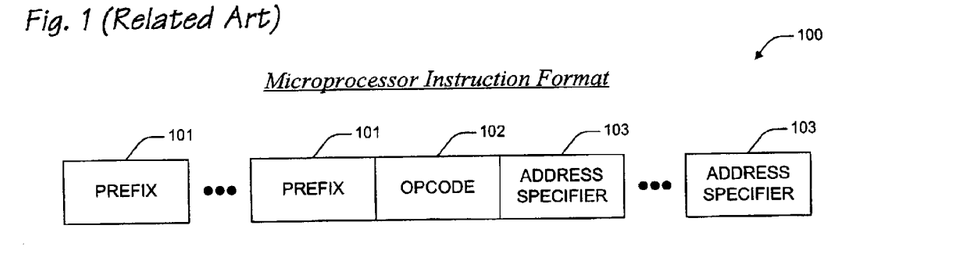
FIG. 1 is a block diagram illustrating a related art microprocessor instruction format.
Figure 2:
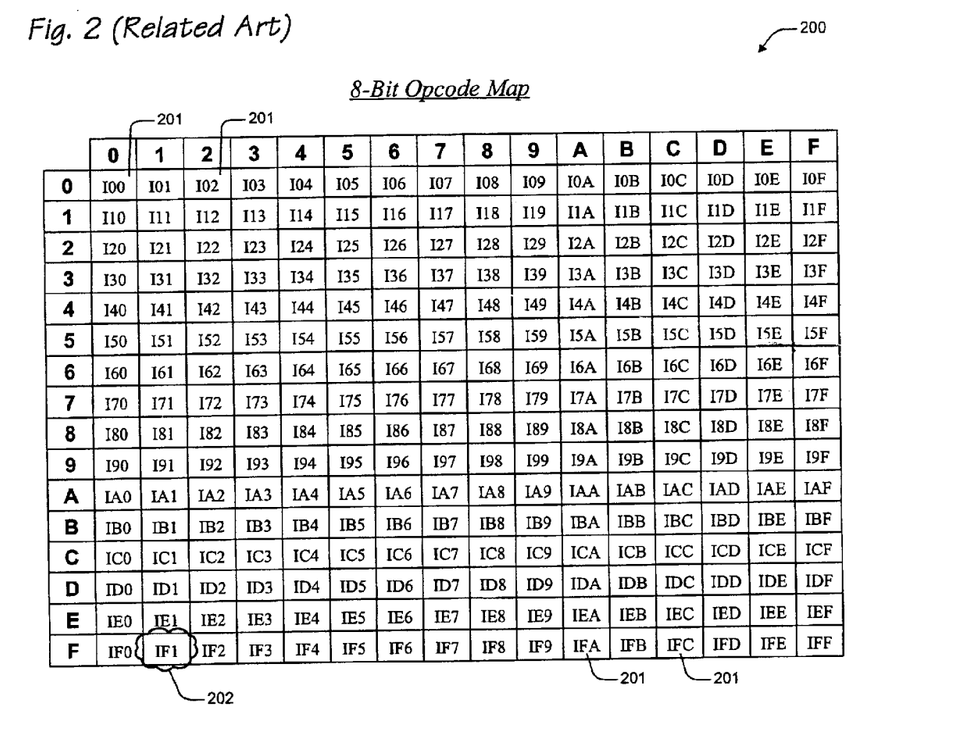
FIG. 2 is a table depicting how instructions in an instruction set architecture are mapped to logic states of bits in an opcode byte within the instruction format of FIG. 1.

In view of the above background discussion on the techniques employed within present day microprocessors to extend the architectural features of those microprocessors beyond the capabilities of their associated instruction sets, a related art example will now be discussed with reference to FIGS. 1–2. The discussion highlights the dilemma that microprocessor designers routinely face where, on the one hand, they desire to incorporate more recently developed architectural features into a microprocessor design and where, on the other hand, they wish to retain the capability to execute legacy application programs. In the example of FIGS. 1–2, a fully populated opcode map rules out the possibility of adding new opcodes to the exemplary architecture, thus compelling the designers to choose either to incorporate the new features and sacrifice legacy compatibility to some degree, or to forego more recent architectural advances altogether in favor of maintaining the microprocessor's compatibility with older application programs. Following the related art discussion, a discussion of the present invention will be provided with reference to FIGS. 3–11. By identifying and exploiting an existing, but unemployed, opcode as a prefix tag for an extended instruction that follows, the present invention enables microprocessor designers to overcome the limitations of completely full instruction set architectures, thereby allowing them to provide conditional execution capabilities while at the same time retaining compatibility with legacy application programs.

Turning to FIG. 1, a block diagram is presented illustrating a related art microprocessor instruction format 100. The related art instruction 100 has a variable number of data entities 101–103, each set to a specified value, that together make up a specific instruction 100 for a microprocessor. The specific instruction 100 directs the microprocessor to perform a specific operation such as adding two operands together, or moving an operand from memory to a register within the microprocessor. In general, an opcode entity 102 within the instruction 100 prescribes the specific operation to be performed, and optional address specifier entities 103 follow the opcode 101 prescribing additional information about the specific operation such as how the operation is to be performed, where the operands are located, etc. The instruction format 100 additionally allows a programmer to prefix an opcode 102 with prefix entities 101. The prefixes 101 direct the application of specified architectural features during the execution of the specific operation prescribed by the opcode 102. In general, these architectural features span the breadth of operations that can be prescribed by any of the opcodes 102 in the instruction set. For example, prefixes 101 exist today in a number of microprocessors that can cause operations to be executed using different size operands (e.g., 8-bit, 16-bit, 32-bit). And while many of these processors are programmed to a default operand size (say, 32-bit), prefixes 101 are provided in their respective instruction sets that enable programmers to selectively override the default operand size (say, to perform 16-bit operations) on an instruction-by-instruction basis. Selectable operand size is merely one example of an architectural feature that spans a significant number of operations (e.g., add, subtract, multiply, Boolean logic, etc.) specifiable by opcodes 102 within many present day microprocessors.

One well-known instance of the instruction format 100 shown in FIG. 1 is the x86 instruction format 100, which is employed by all present day x86-compatible microprocessors. More specifically, the x86 instruction format 100 (also known as the x86 instruction set architecture 100) uses 8-bit prefixes 101, 8-bit opcodes 102, and 8-bit address specifiers 103. The x86 architecture 100 has several prefixes 101 as well, two of which override default address/data sizes of an x86 microprocessor (i.e., opcode states 66H and 67H), another which directs the microprocessor to interpret a following opcode byte 102 according to different translation rules (i.e., prefix value 0FH, which causes translation to be performed according to the so-called 2-byte opcode rules), and others which cause particular operations to be repeated until some criteria is satisfied (i.e., the REP opcodes: F0H, F2H, and F3H).

Referring now to FIG. 2, a table 200 is presented depicting how instructions 201 in an instruction set architecture are mapped to logic states of bits in an opcode byte 102 within the instruction format of FIG. 1. The table 200 presents an exemplary 8-bit opcode map 200 that associates up to 256 values of an 8-bit opcode entity 102 with corresponding microprocessor opcode instructions 201. The table 200 maps a particular value of an opcode entity 102, say value 02H, to a corresponding opcode instruction 201 (i.e., instruction I02). In the case of the x86 opcode map, it is well known in the art that opcode value 14H is mapped to the x86 Add With Carry (ADC) instruction, which directs that an 8-bit immediate operand be added to the contents of architectural register AL. One skilled in the art will also appreciate that the x86 prefixes 101 alluded to above (i.e., 66H, 67H, 0FH, F0H, F2H, and F3H) are actually opcode values 201 that contextually specify the application of certain architectural extensions to the operation prescribed by a following opcode entity 102. For example, preceding opcode 14H (normally, the ADC opcode discussed above) with prefix 0FH results in an x86 processor executing an Unpack and Interleave Low Packed Single-Precision Floating-Point Values (UNPCKLPS) operation instead of the Add With Carry (ADC). Features such as described in this x86 example are enabled in part in a present day microprocessor because instruction translation/decoding logic in the microprocessor interprets the entities 101–103 of an instruction 100 in order. Hence, the use of specific opcode values as prefixes 101 in instruction set architectures has, in past times, allowed microprocessor designers to incorporate a significant number of advanced architectural features into a complying microprocessor design without disadvantageously impacting the execution of older programs which do not employ those specific opcode states. For example, a legacy program that never uses x86 opcode 0FH will still run on a present day x86 microprocessor. And a newer application program, by employing x86 opcode 0FH as a prefix 101, can utilize a substantial number of x86 architectural features such as single instruction multiple data (SIMD) operations, conditional move operations, and etc.

Notwithstanding the fact that architectural features have been provided for in the past by designating available/spare opcode values 201 as prefixes 101 (also known as architectural feature tags/indicators 101 or escape instructions 101), many instruction set architectures 100 have run into a brick wall in terms of providing enhancements for a very straightforward reason: all of the available/spare opcode states have been used up, that is, all of the opcode values in the opcode map 200 have been architecturally specified. When all of the available opcode values have been assigned as either opcode entities 102 or prefix entities 101, then there are no more values left to provide for the incorporation of new features. This significant problem exists in many microprocessor architectures today and consequently forces designers to choose between adding architectural features to a design and retaining compatibility with older programs.

It is notable that the instructions 201 shown in FIG. 2 are depicted generically (i.e., I24, I86) rather than specifically (i.e., Add With Carry, Subtract, Exclusive-OR). This is because fully occupied opcode maps 200 are presently precluding the incorporation of more recent architectural advances in a number of different microprocessor architectures. And although an 8-bit opcode entity 102 is alluded to in the example of FIG. 2, one skilled in the art will appreciate that the specific size of the opcode 102 is irrelevant in any sense other than its use as a specific case to teach the problem of a full opcode structure 200. Accordingly, a full 6-bit opcode map would have 64 architecturally specified opcodes/prefixes 201 and would provide no available/spare opcode values for expansion.

One alternative short of entirely obliterating an instruction set and replacing it with a new format 100 and opcode map 200 is to substitute new instruction meanings for only a subset of existing opcodes 201, say opcodes 40H through 4FH in FIG. 2. Under this hybrid technique, a conforming microprocessor is provided with means to operate in a legacy-compatible mode, where opcodes 40H–4FH are interpreted according to legacy rules, or to operate in an enhanced mode, where opcodes 40H–4FH are interpreted according to enhanced architectural rules. This technique does allow designers to incorporate new features into a design, however, disadvantages prevail when the conforming microprocessor is running in an enhanced mode because it excludes execution of any application program that uses opcodes 40H–4FH. Hence, from the standpoint of retaining legacy compatibility, the legacy-compatible/enhanced mode technique is unacceptable.

The present inventors, however, have noted the use of opcodes 201 in instruction sets 200 having fully-populated opcode spaces over the gamut of application programs composed for execution on compliant microprocessors, and they have observed that there are some instructions 202 which, although they are architecturally specified, are not employed within application programs that are capable of being executed by the microprocessors. Instruction IF1 202 is depicted in FIG. 2 as such an example of this phenomenon. In fact, the same opcode value 202 (i.e., F1H) maps to a valid instruction 202 that is not used in the x86 instruction set architecture. While the unused x86 instruction 202 is a valid x86 instruction 202 that directs an architecturally specified operation on an x86 microprocessor, it is not employed in any application program that can be executed on any present day x86 microprocessor. The particular x86 instruction 202 is called In Circuit Emulation Breakpoint (i.e., ICE BKPT, opcode value F1H), and was formerly employed exclusively in a class of microprocessor emulation equipment that no longer exists today. ICE BKPT 202 was never employed in an application program outside of an in-circuit emulator, and the form of in-circuit emulation equipment that formerly employed ICE BKPT 202 no longer exists. Hence, in the x86 case, the present inventors have identified a means within a completely occupied instruction set architecture 200 whereby they can exploit a valid, yet unused, opcode 202 to allow for the incorporation of advanced architectural features in a microprocessor design without sacrificing legacy compatibility. In a fully-occupied instruction set architecture 200, the present invention employs an architecturally specified, yet unemployed, opcode 202 as a indicator tag for in an n-bit prefix that follows, thus allowing microprocessor designers to incorporate up to $2^n$ more recently developed architectural features into a microprocessor design, while concurrently retaining complete compatibility with all legacy software.

The present invention exploits the prefix tag/extended prefix concept by providing an n-bit condition code specifier prefix whereby programmers are allowed to program a conventional operation for execution by a microprocessor (e.g., addition, subtraction, Boolean operation, operand manipulation, etc.) and, within the same instruction, specify a condition upon which execution of the operation depends. In one embodiment, the state of a microprocessor's condition codes, stored in a condition code register, are evaluated prior to executing the specified operation. If evaluation of the condition codes determines that the condition is realized, then the specified operation is performed. If it is determined that the condition is not met, then the specified operation is not performed. The present invention will now be further discussed with reference to FIGS. 3–11.

Figure 3:
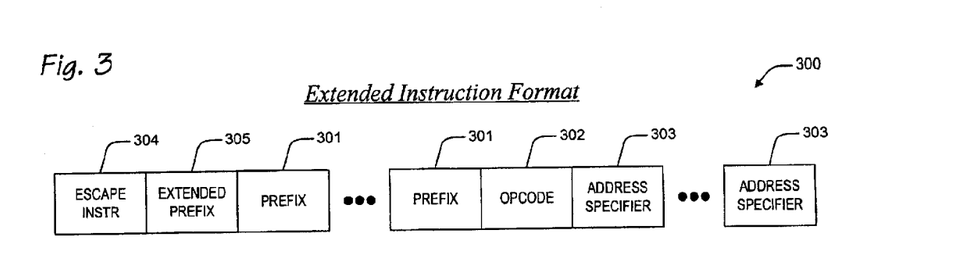
FIG. 3 is a block diagram featuring an extended instruction format according to the present invention.

Turning to FIG. 3, a block diagram is presented featuring an extended instruction format 300 according to the present invention. Very much like the format 100 discussed with reference to FIG. 1, the extended instruction format 300 has a variable number of data entities 301–305, each set to a specified value, that together make up a specific instruction 300 for a microprocessor. The specific instruction 300 directs the microprocessor to perform a specific operation such as adding two operands together, or moving an operand from memory to a register within the microprocessor. In general, an opcode entity 302 in the instruction 300 prescribes the specific operation to be performed, and optional address specifier entities 303 follow the opcode 302 prescribing additional information about the specific operation such as how the operation is to be performed, where the operands are located, etc. The instruction format 300 also allows a programmer to prefix an opcode 302 with prefix entities 301, which direct the application of existing architectural features during the execution of the specific operation prescribed by the opcode 302.

The extended instruction 300 according to the present invention, however, is a superset of the instruction format 100 described above with reference to FIG. 1, having two additional entities 304, 305 which are optionally provided as an instruction extension to precede all remaining entities 301–303 in a formatted extended instruction 300. The purpose of the two additional entities 304, 305 is to enable/disable a plurality of conditional execution features which would otherwise be not specifiable within a fully populated instruction set architecture. The optional entities 304, 305 are an extended instruction tag 304 and an extended conditional execution prefix 305. The extended instruction tag 305 is an otherwise architecturally specified opcode within a microprocessor instruction set. In an x86 embodiment, the extended instruction tag 304, or escape tag 304, is opcode state F1H, the formerly used ICE BKPT instruction. The escape tag 304 indicates to microprocessor logic that the conditional execution prefix 305, or extended features specifier 305, follows, where the extended features specifier 305 prescribes a condition upon which an operation prescribed by the extended instruction 300 depends. In one embodiment, the extended instruction tag 304 indicates that accompanying parts 301–303, 305 of a corresponding extended instruction 300 prescribe an extended operation to be conditionally performed by the microprocessor. The extended prefix 305, or condition specifier prescribes a condition codes state that is provided to conditional execution control logic that is configured to enable/disable performance of the extended operation.

To summarize the conditional execution extension technique according to the present invention, an instruction extension is configured from one of the opcodes/instructions 304 in an existing instruction set architecture and an n-bit extended features prefix 305. The selected opcode instruction serves as an indicator 304 that the instruction 300 is a conditional execution instruction 300 (that is, it prescribes conditional execution extensions to the microprocessor architecture), and the n-bit features prefix 305 specifies a subset of a plurality of condition codes upon which execution of a specified operation depends, the specified operation being prescribed by remaining entities of the extended instruction 300. In one embodiment, the extended prefix 305 is 8-bits in size, providing for the specification of up to 256 different subsets of the plurality of condition codes upon which processing of current instructions in an existing instruction set could depend. An n-bit prefix embodiment provides for the specification of up to $2^n$ different condition code combinations to be employed during conditional execution of a specified operation.

Figure 4:
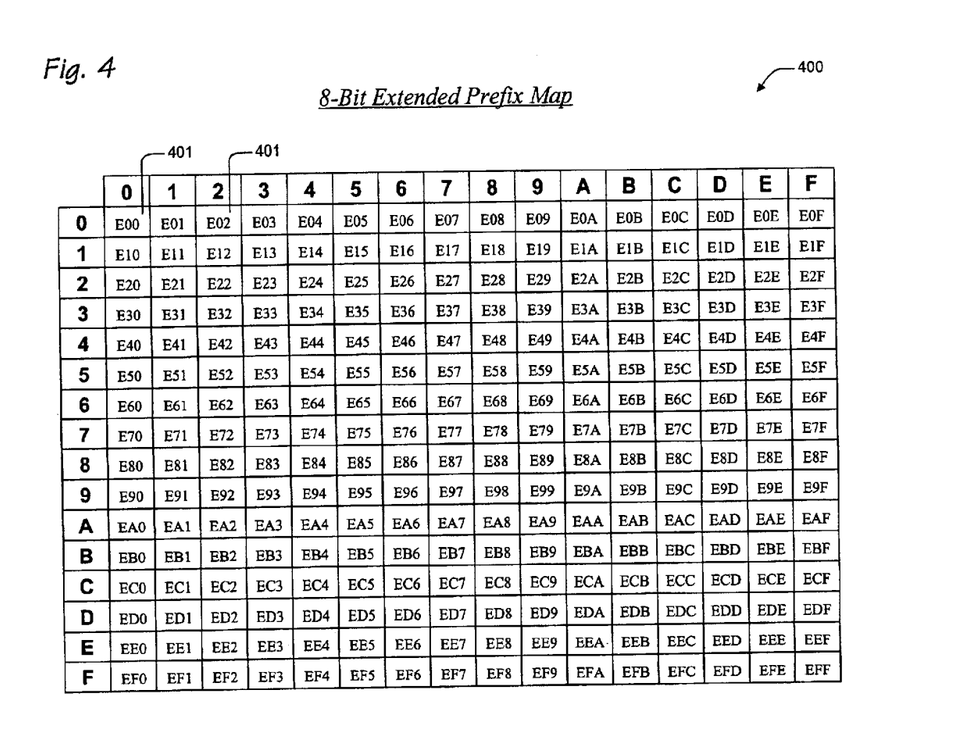
FIG. 4 is a table showing how extended architectural features are mapped to logic states of bits in an 8-bit extended prefix embodiment according to the present invention.

Now turning to FIG. 4, a table 400 is presented showing how conditional execution extensions are mapped to logic states of bits in an 8-bit extended prefix embodiment according to the present invention. Similar to the opcode map 200 discussed with reference to FIG. 2, the table 400 of FIG. 4 presents an exemplary 8-bit condition code prefix map 400 that associates up to 256 values of an 8-bit extended prefix entity 305 with corresponding conditions code states 401 (e.g., E34, E4D, etc.) of a conforming microprocessor. In the case of an x86 embodiment, the 8-bit extended feature prefix 305 according to the present invention serves to provide for extended conditional execution specifiers 401 (i.e., E00–EFF) which are not provided for by the current x86 instruction set architecture.

The extended features 401 shown in FIG. 4 are depicted generically rather than specifically because the technique according to the present invention is applicable to a variety of different architectural extensions 401 and specific instruction set architectures. One skilled in the art will appreciate that many different architectural features 401, a few of which are noted above, can be incorporated into an existing instruction set according to the escape tag 304/extended prefix 305 technique described herein. The 8-bit prefix embodiment of FIG. 4 provides for up to 256 different features 401, however, an n-bit prefix embodiment can allow for programming of up to $2^n$ different features 401.

In embodiments that correspond to the types of condition code storage and representation means common to many present day microprocessors, conditions can be specified such as zero, not zero, even parity, odd parity, sign, not sign, overflow, not overflow, carry, not carry, and combinations of conditions can also be specified to include above (i.e., not carry and not zero), below or equal (i.e., carry and zero), greater (i.e., not zero and sign equals carry), etc. In many of these microprocessors, a condition code status entity (i.e., a register) is configured with a plurality of condition code bits (or flags), each of which represents whether or not a recently generated result has crossed some result boundary condition such as generating a carry bit, or having a sign bit indicating that the result is a negative number. The states of the conditions described above, however, are not intended to limit the scope of the present invention to one particular set of microprocessor condition codes. The above embodiments are provided as examples of how a conditional prefix 305 is encoded according to the present invention to provide condition subsets upon which execution of an operation by a conforming microprocessor depends. One skilled in the art will appreciate that configuration of a particular extended conditions prefix 305 is based upon how condition codes are represented and stored in a corresponding microprocessor.

Figure 5:
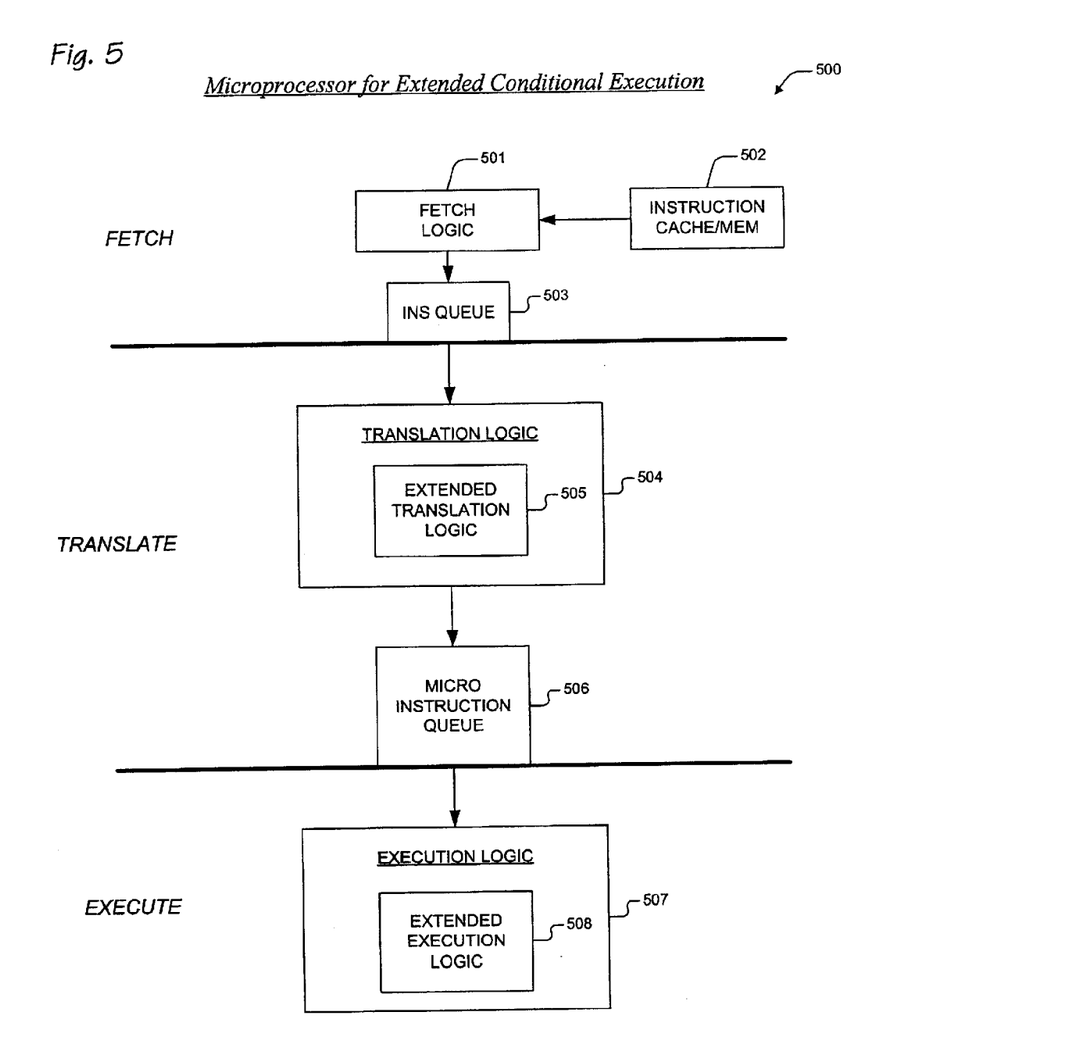
FIG. 5 is a block diagram illustrating a pipeline microprocessor for performing conditional execution of instructions according to the present invention.

Now referring to FIG. 5, a block diagram is presented illustrating a pipeline microprocessor 500 for executing extended conditional execution instructions 300 according to the present invention. The microprocessor 500 has three notable stage categories: fetch, translate, and execute. The fetch stage has fetch logic 501 that retrieves instructions from an instruction cache 502 or external memory 502. The retrieved instructions are provided to the translate stage via an instruction queue 503. The translate stage has translation logic 504 that is coupled to a micro instruction queue 506. The translation logic 504 includes extended translation logic 505. The execute stage has execution logic 507 having extended execution logic 508 therein.

In operation, the fetch logic 501 retrieves formatted instructions according to the present invention from the instruction cache/external memory 502, and places these instructions in the instruction queue 503 in execution order. The instructions are retrieved from the instruction queue 503 and are provided to the translation logic 504. The translation logic 504 translates/decodes each of the provided instructions into a corresponding sequence of micro instructions that direct the microprocessor 500 to conditionally perform the operations prescribed by the instructions, subject to realization of specified conditions. The extended translation logic 505 detects those instructions having the extended prefix tag according to the present invention and also provides for translation/decoding of corresponding condition specifier prefixes. In an x86 embodiment, the extended translation logic 505 is configured to detect an extended prefix tag of value F1H, which is the x86 ICE BKPT opcode. Micro instruction fields are provided in the micro instruction queue 506 to specify condition code states that are prescribed within extended instructions.

The micro instructions are provided from the micro instruction queue 506 to the execution logic 507, wherein the extended execution logic 508 detects micro instructions having conditional execution enabled as indicated by the micro instruction fields and evaluates condition code storage entities prior to execution of the specified operation. If the evaluation of the entities determines that the condition code states are true, then the extended execution logic 508 performs the specified operation. If the condition code states are false, then performance of the specified operation is precluded.

One skilled in the art will appreciate that the microprocessor 500 described with reference to FIG. 5 is a simplified representation of a present day pipeline microprocessor 500. In fact, a present day pipeline microprocessor 500 comprises upwards to 20–30 different pipeline stages. However, these stages can be generally categorized into those three stage groups shown in the block diagram and thus, the block diagram 500 of FIG. 5 serves to teach the essential elements that are required to implement embodiments of the present invention as described hereinabove. Those extraneous elements of a microprocessor 500, for clarity sake, are not depicted for discussion.

Figure 6:
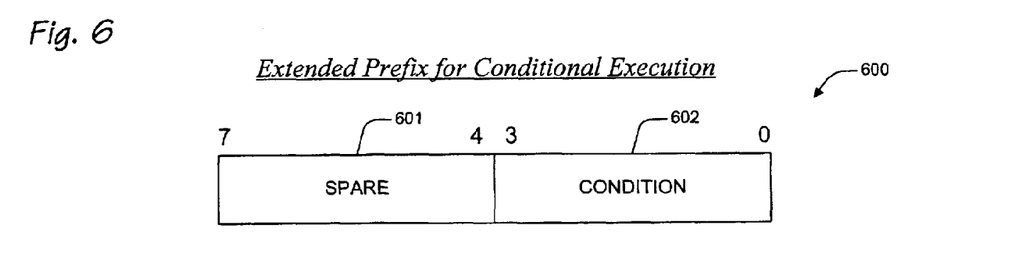
FIG. 6 is a block diagram featuring one embodiment of an extended prefix for conditional execution according to the present invention.

Turning now to FIG. 6, a block diagram is presented featuring one embodiment of an extended prefix 600 for conditional execution according to the present invention. The extended condition specifier prefix 600 is an 8-bit extended prefix 600 and has a condition field 602 comprising bits 3:0 and a spare field 601 comprising bits 7:4.

Figure 7:
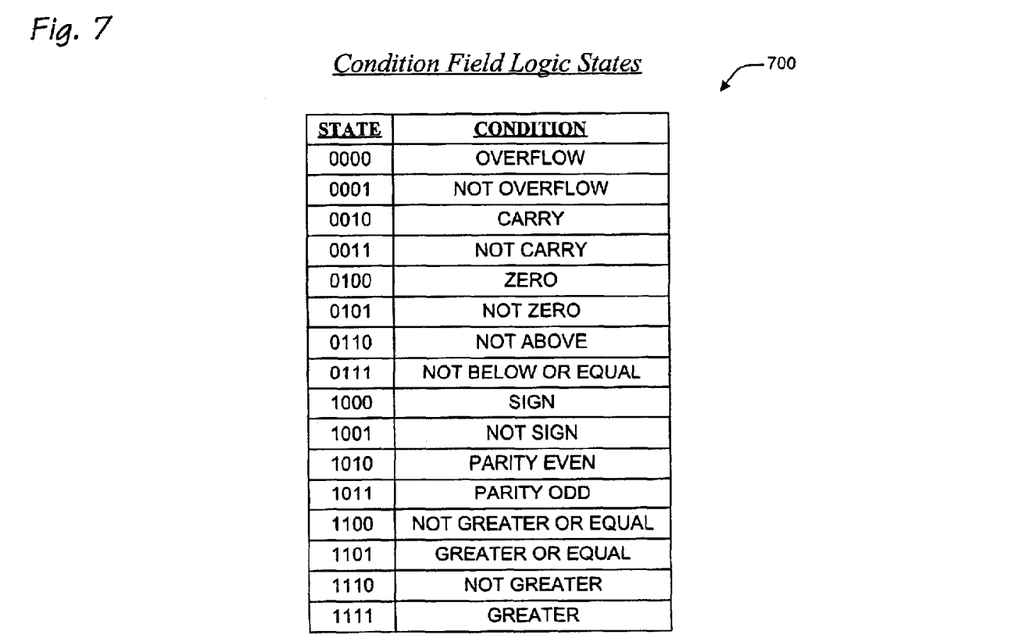
FIG. 7 is a table showing conditions specified by values of the extended prefix of FIG. 6.

FIG. 7 is a table 700 showing exemplary conditions specified by values of the extended prefix of FIG. 6. Some of the conditions, such as parity even and not sign, represent the state of individual condition code flags in many present day microprocessor architectures, while other conditions, such as not above and greater or equal, represent combinations of individual condition code flags.

The exemplary embodiment discussed with reference to FIGS. 6 and 7 are provided to illustrate the flexibility of the present invention to adapt to the specific means of condition code representation of a candidate instruction set architecture. One skilled in the art will, however, appreciate that the examples of FIGS. 6 and 7 do not limit the scope of the present invention to 4-bit condition specifiers.

Figure 8:
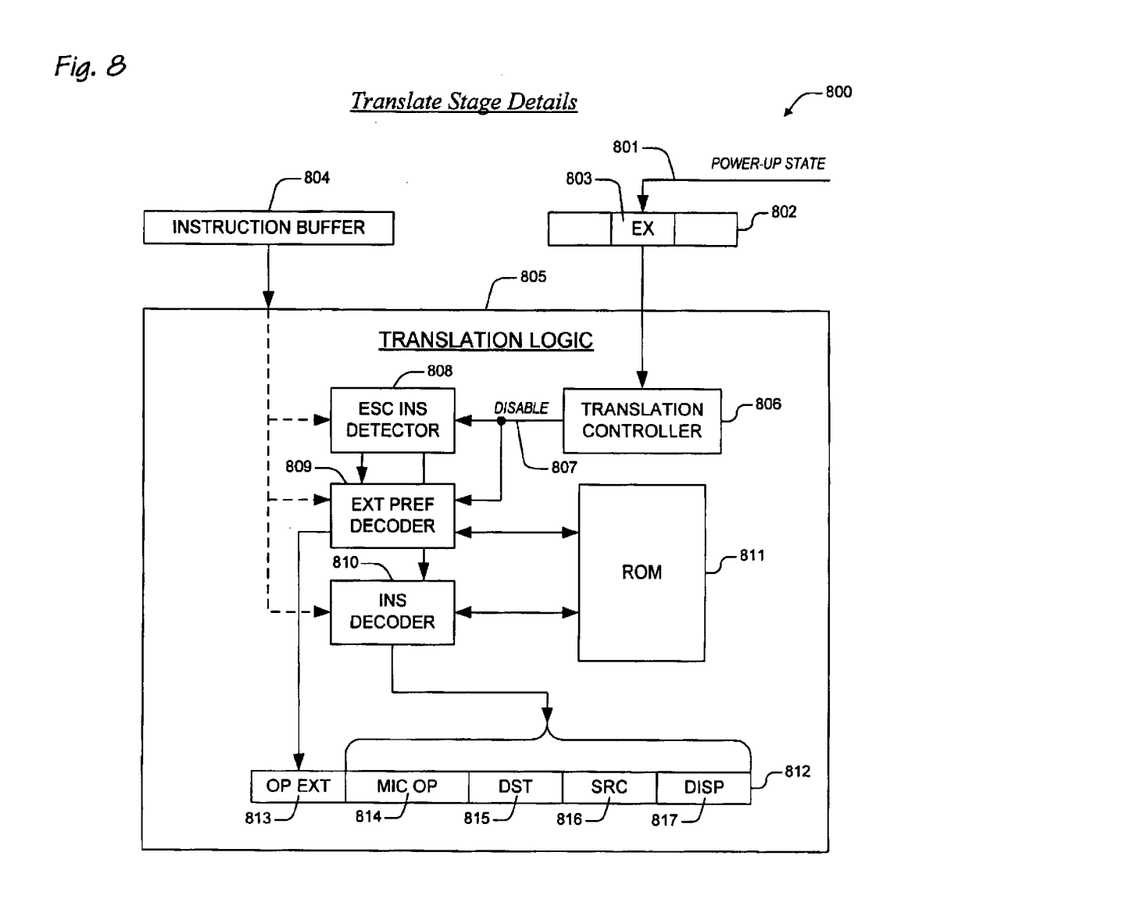
FIG. 8 is a block diagram featuring details of translate stage logic within the microprocessor of FIG. 5.

Turning now to FIG. 8, a block diagram is presented featuring details of translate stage logic 800 within the microprocessor of FIG. 5. The translate stage logic has an instruction buffer 804 that provides an extended conditional execution instruction according to the present invention to translation logic 805. The translation logic 805 is coupled to a machine specific register 802 that has an extended features field 803. The translation logic 805 has a translation controller 806 that provides a disable signal 807 to an escape instruction detector 808 and an extended prefix decoder 809. The escape instruction detector 808 is coupled to the extended prefix decoder 809 and an instruction decoder 810. The extended prefix decoding logic 809 and the instruction decoding logic 810 access a control read-only memory (ROM) 811, wherein are stored template micro instruction sequences that correspond to some of the extended instructions. The translation logic 805 also has a micro instruction buffer 812 having an opcode extension field 813, a micro opcode field 814, a destination field 815, a source field 816, and a displacement field 817.

Operationally, during power-up of the microprocessor, the state of the extended field 803 within the machine specific register 802 is established via signal power-up state 801 to indicate whether the particular microprocessor is capable of translating and executing extended conditional execution instructions according to the present invention. In one embodiment, the signal 801 is derived from a feature control register (not shown) that reads a fuse array (not shown) that was configured during fabrication of the part. The machine specific register 802 provides the state of the extended features field 803 to the translation controller 806. The translation control logic 806 controls whether or not instructions from the instruction buffer 804 are translated according to extended conditional execution translation rules or according to existing translation rules. Such a control feature is provided to allow supervisory applications (e.g., BIOS) to enable/disable extended execution features of the microprocessor. If conditional execution is disabled, then instructions having the opcode state selected as the extended features tag would be translated according to existing translation rules. In an x86 embodiment having opcode state F1H selected as the tag, then an occurrence of F1H under conventional translation would result in an illegal instruction exception. Under extended translation rules, however, occurrence of the tag would be detected by the escape instruction detector 808. The escape instruction detector 808 would accordingly disable operation of the instruction decoder 810 during translation/decode of a following extended condition specifier prefix by the extended prefix decoder 809 and would enable the instruction decoder 810 for translation/decode of the remaining parts of the extended instruction. Certain instructions would cause access to the control ROM 811 to obtain corresponding micro instruction sequence templates. The opcode extension field 813 of the micro instruction buffer 812 is configured by the prefix decoder 809 to prescribe the condition upon which execution of a specified operation depends. The remaining buffer fields 814–817 are configured by the instruction decoder 810. Configured micro instructions 812 are provided to a micro instruction queue (not shown) for subsequent execution by the processor.

Figure 9:
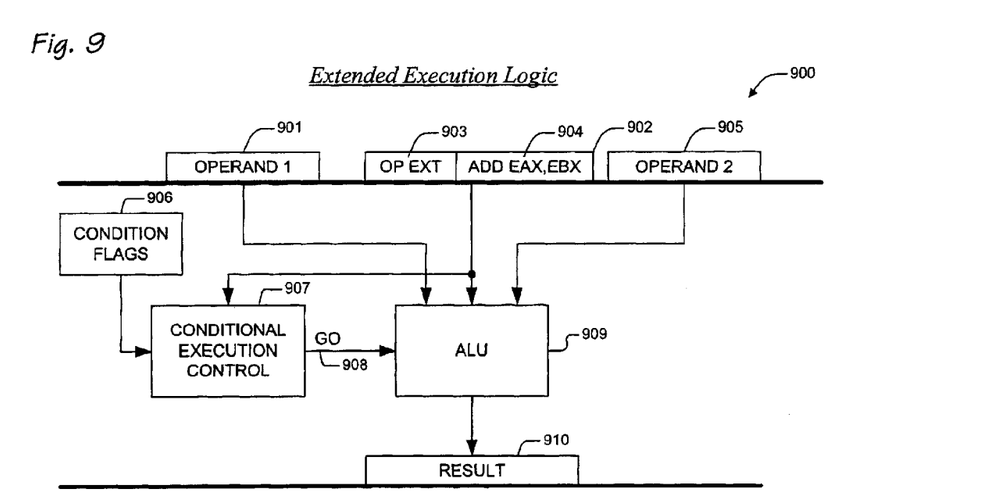
FIG. 9 is a block diagram illustrating extended execution logic within the microprocessor of FIG. 5.

Now referring to FIG. 9, a block diagram is presented illustrating extended execution logic 900 within the microprocessor of FIG. 5. The extended execution logic 900 has an arithmetic logic unit (ALU) 909 that is coupled to conditional execution control logic 907 via an enable signal GO 908. The conditional execution controller 907 accesses a condition flags storage mechanism 906, or condition flags register 906. Two operands, OPERAND 1 and OPERAND 2, are retrieved from operand registers 901, 905 by the ALU 909. A micro instruction register 902 provides a micro instruction to both the ALU 909 and the conditional execution controller 907. The micro instruction register 902 has an opcode extension field 903 and a remaining field 904. The ALU is additionally coupled to a result register 910.

In operation, when an extended conditional execution instruction is translated into a micro instruction sequence according to the present invention, extended micro instructions are provided to the extended execution logic 900 via the micro instruction register 902 along with applicable operands in registers 901 and 905. If the opcode extension field 903 indicates conditions upon which execution of an operation prescribed by the remaining field 904 depends, then prior to execution of the operation, the conditional execution control logic 907 accesses the condition flags storage 906 to evaluate whether or not the conditions are true. If the conditions are true, then the execution controller 907 directs the ALU 909 via signal GO 908 to perform the specified operation, thus providing a result to the result register 910. If the conditions are false, then signal GO 908 is not asserted, thus directing the ALU 909 to preclude execution of the operation and hence, no result is provided to the result register 910.

Figure 10:
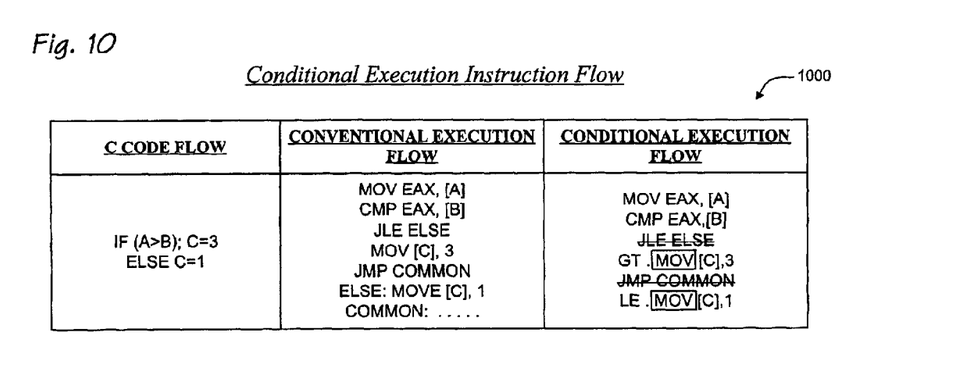
FIG. 10 is a table contrasting conditional execution flow with conventional execution flow for a common IF-THEN-ELSE statement.

Now turning to FIG. 10, a table 1000 is provided contrasting conditional execution flow with conventional execution flow for a common IF-THEN-ELSE statement. In the left-hand column, the table 1000 shows a very common C Code expression that compares two operands, A and B. If A is greater than B, then operand C is set to 3. If A is not greater than B, then operand C is set to 1. This type of expression is very common to many application programs. Furthermore, the outcome of this type of comparison is not always predictable.

The middle column of the table 1000 shows a conventional x86 execution flow that implements the C expression. First, instruction MOV EAX, [A] fetches operand A from memory to register EAX. Next, instruction CMP EAX, [B] compares the contents of register EAX with operand B in memory. Conditional jump instruction JLE ELSE checks the status of condition codes generated by the previous compare instruction. If the condition codes indicate that a less than or equal condition resulted from the compare, then program flow branches to label ELSE, when operand C is set to 1. Otherwise, operand C is set to 3 and program flow is directed by a following unconditional jump instruction, JMP COMMON, to label COMMON where program flow continues.

In a deeply pipelined present day microprocessor, if branch prediction logic mispredicts the outcome of the conditional jump instruction, JLE ELSE, then numerous instructions must be flushed from the instruction pipeline to begin execution of instructions according to correct program flow.

Conditional execution flow of the same C expression is shown in the right-hand column of the table 1000 to illustrate how extended instructions according to the present invention are employed to eliminate pipeline flushes due to mispredicted branch outcomes. In contrast to executing a conditional jump instruction (i.e., JLE ELSE) and a subsequent unconditional jump instruction (i.e., JMP COMMON), two extended conditional move instructions (GT.MOV [C],3 followed by LE.MOV [C],1) are executed. Execution of the first move operation is conditioned upon result of the compare instruction (i.e., CMP EAX, [B]). If the result of the compare is greater than, then the first move operation is performed, setting operand C to 3. If the result of the compare is less than or equal, then the first move operation is precluded, and a second move operation is executed to set operand C to 1. Hence, instruction flow according to the present invention eliminates all pipeline flushes that presently are encountered due to branch outcome mispredictions.

Figure 11:
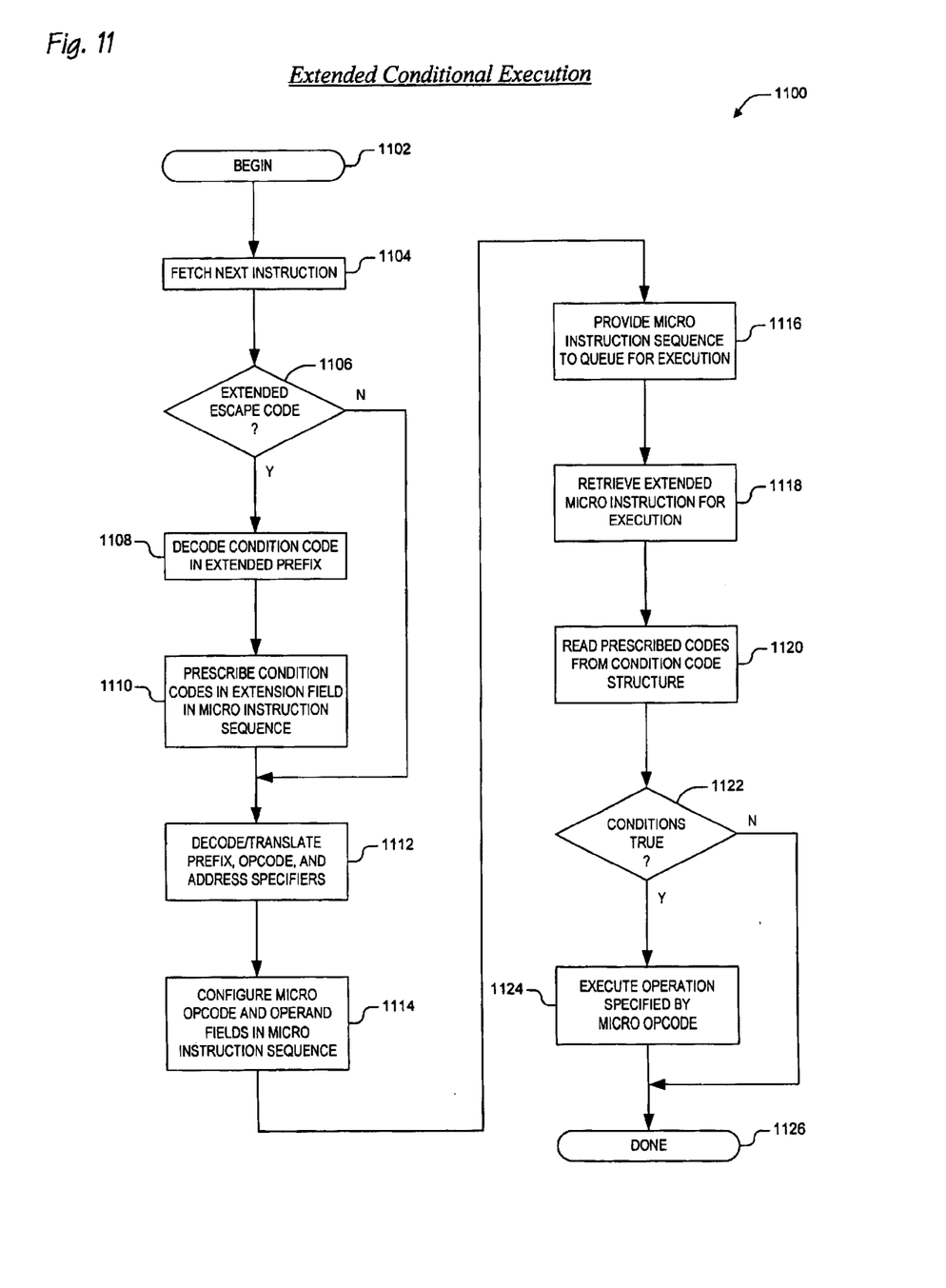
FIG. 11 is a flow chart depicting a method for translating and executing conditional instructions according to the present invention.

Now referring to FIG. 11, a flow chart 1100 is presented depicting a method for translating and executing conditional instructions according to the present invention. Flow begins at block 1102 wherein a program configured with conditional execution instructions is provided to a microprocessor. Flow then proceeds to block 1104.

At block 1104, a next instruction is fetched from cache/memory. Flow then proceeds to decision block 1106.

At decision block 1106, the next instruction fetched in block 1104 is evaluated to determine whether or not it contains an extended escape tag/code. If not, then flow proceeds to block 1112. If the extended escape code is detected, then flow proceeds to block 1108.

At block 1108, because an extended escape tag has been detected in block 1106, translation/decoding is performed on an extended prefix to determine a specified condition upon which execution of a corresponding operation depends. Flow then proceeds to block 1110.

At block 1110, corresponding fields of a micro instruction sequence are configured to indicate the specified condition as prescribed by the extended prefix. Flow then proceeds to block 1112.

At block 1112, the remaining parts of the instruction (e.g., prefix entities, opcode, address specifiers) are translated/decoded to determine the operation to be conditionally performed along with associated operand attributes. Flow then proceeds to block 1114.

At block 1114, remaining fields of a micro instruction sequence are configured to prescribe the specified operation along with its operand specifications. Flow then proceeds to block 1116.

At block 1116, the micro instruction sequence, comprising the opcode extension field configured in block 1110 along with the remaining fields configured in block 1114, is provided to a micro instruction queue for execution by the microprocessor. Flow then proceeds to block 1118.

At block 1118, the micro instruction sequence is retrieved by extended conditional execution logic according to the present invention. Flow then proceeds to block 1120.

At block 1120, the extended conditional execution logic accesses a condition code storage structure to read the state of codes corresponding to the condition specified in the opcode extension field. Flow then proceeds to decision block 1122.

At decision block 1122, the state of the codes are evaluated to determine whether or not the specified condition is realized. If so, then flow proceeds to block 1124. If the specified condition is not realized, then flow proceeds to block 1126, thus precluding execution of the specified operation.

At block 1124, because the specified condition is true, the specified operation is executed. Flow then proceeds to block 1126.

At block 1126, the method completes.

Although the present invention and its objects, features, and advantages have been described in detail, other embodiments are encompassed by the invention as well. For example, the present invention has been described in terms of a technique that employs a single, unused, opcode state within a completely full instruction set architecture as a tag to indicate that an extended feature prefix follows. But the scope of the present invention is not limited in any sense to full instruction set architectures, or unused instructions, or single tags. On the contrary the present invention comprehends instruction sets that are not entirely mapped, embodiments having used opcodes, and embodiments that employ more than one instruction tag. For example, consider an instruction set architecture where there are no unused opcode states. One embodiment of the present invention comprises selecting an opcode state that is presently used as the escape tag, where the selection criteria is determined according to market-driven factors. An alternative embodiment comprehends employing a peculiar combination of opcodes as the tag, say back-to-back occurrences of opcode state 7FH. The essential nature of the present invention thus embodies use of a tag sequence followed by an n-bit extension prefix that conditions execution of an operation specified by an extended instruction upon satisfaction of a subset of a plurality of conditions prescribed by the n-bit extension prefix.

In addition, the present invention has been exemplified by a microprocessor having a set of condition codes, or flags, that indicate boundary conditions of a previously generated result to include parity, overflow, sign, and zero. And although these types of condition indicators prevail in use today, it is not the intention of the present invention to restrict application to only these types of conditions. For instance, alternative embodiments of the present invention comprehend alternative specified conditions such as the state of contents of a particular register, whether or not a port or other I/O device is in use, the availability of memory or cache, and etc.

Furthermore, although a microprocessor setting has been employed to teach the present invention and its features and advantages, one skilled in the art will appreciate that its scope extends beyond the boundaries of microprocessor architecture to include all forms of programmable devices such as signal processors, industrial controllers, array processors, and the like.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

What is claimed is:

1. In a microprocessor, a conditional execution apparatus, comprising:
   translation logic, for translating an extended instruction into corresponding micro instructions, wherein said extended instruction comprises:
   an extended prefix, for specifying a condition, wherein execution of an operation prescribed by said extended instruction depends upon realization of said condition; and
   an extended prefix tag, for indicating said extended prefix, wherein said extended prefix tag is an otherwise architecturally specified opcode within an instruction set for the microprocessor; and
   extended execution logic, coupled to said translation logic, for receiving said corresponding micro instructions, and for evaluating said condition, wherein, if said condition is not realized, then said extended execution logic precludes execution of said operation.

2. The conditional execution apparatus as recited in claim 1, wherein said extended instruction further comprises architecturally specified entities according to said instruction set.

3. The conditional execution apparatus as recited in claim 2, wherein said architecturally specified entities comprise:
   an opcode entity, for prescribing said operation.

4. The conditional execution apparatus as recited in claim 1, wherein said extended prefix comprises a plurality of bits, and wherein each logic state of said plurality of bits corresponds to a subset of a plurality of result conditions.

5. The conditional execution apparatus as recited in claim 4, wherein said plurality of result conditions comprises overflow, carry, zero, below, sign, parity, greater than, and less than.

6. The conditional execution apparatus as recited in claim 5, wherein said plurality of result conditions are maintained in a flags register in the microprocessor.

7. The conditional execution apparatus as recited in claim 1, wherein said extended prefix comprises 8 bits.

8. The conditional execution apparatus as recited in claim 1, wherein said instruction set comprises the x86 instruction set.

9. The conditional execution apparatus as recited in claim 8, wherein said extended prefix tag comprises opcode F1 (ICE BKPT) in the x86 instruction set.

10. The conditional execution apparatus as recited in claim 1, wherein said corresponding micro instructions comprise a micro opcode field and a micro opcode extension field.

11. The conditional execution apparatus as recited in claim 10, wherein said extended execution logic employs said micro opcode extension field to determine said condition, and wherein said extended execution logic employs said micro opcode field to determine said operation.

12. The conditional execution apparatus as recited in claim 11, where said extended execution logic comprises:
    a conditional execution controller, configured to evaluate said condition, and to enable/disable execution of said operation according to said condition.

13. The conditional execution apparatus as recited in claim 1, wherein said translation logic comprises:
    escape instruction detection logic, for detecting said extended prefix tag; and
    extended prefix decoding logic, coupled to said escape instruction detection logic, for translating said extended prefix, and for configuring a micro opcode extension field within said corresponding micro instructions, said micro opcode extension field prescribing said condition.

14. The conditional execution apparatus as recited in claim 13, wherein said translation logic further comprises:
    instruction decoding logic, for configuring other fields within said corresponding micro instructions, said other fields prescribing said operation according to said instruction set.

15. An extension mechanism, for adding conditional execution features to an existing microprocessor instruction set, the extension mechanism comprising:
    an extended instruction, configured to specify a subset of a plurality of condition codes upon which execution of a specified operation depends, wherein said extended instruction comprises one of the instructions in the existing microprocessor instruction set followed by an n-bit extended features prefix, said one of the instructions indicating said extended instruction and said n-bit extended features prefix indicating said subset;
    a translator, configured to receive said extended instruction, and configured to generate a micro instruction sequence directing conditional execution of said specified operation according to said subset; and
    conditional execution control logic, coupled to said translator, configured to evaluate said condition codes corresponding to said subset, and configured to execute said specified operation if said subset is realized.

16. The extension mechanism as recited in claim 15, wherein said extended instruction further comprises:
    a plurality of instruction parts, configured to prescribe said specified operation.

17. The extension mechanism as recited in claim 16, wherein said plurality of instruction parts are formatted in accordance with the existing microprocessor instruction set.

18. The extension mechanism as recited in claim 15, wherein said plurality of condition codes comprises overflow, carry, zero, below, sign, parity, greater than, and less than.

19. The extension mechanism as recited in claim 15, wherein said n-bit extended features prefix comprises 8 bits.

20. The extension mechanism as recited in claim 15, wherein the existing microprocessor instruction set is the x86 microprocessor instruction set.

21. The extension mechanism as recited in claim 20, wherein said one of the instructions comprises instruction ICE BKPT (i.e., opcode F1) in the x86 microprocessor instruction set.

22. The extension mechanism as recited in claim 15, wherein said translator comprises:
    an escape instruction detector, for detecting said one of the instructions; and
    an extended prefix decoder, coupled to said escape instruction detector, for translating said n-bit extended features prefix, and for generating a micro opcode extension field within said sequence of micro instructions that prescribes said subset.

23. An instruction set extension apparatus, for providing supplemental conditional execution capabilities to an existing microprocessor instruction set, the instruction set extension apparatus comprising:
    an escape tag, for reception by translation logic, and for indicating that accompanying parts of a corresponding instruction prescribe an extended operation to be conditionally performed by a microprocessor, wherein said escape tag is a first opcode entity within the existing microprocessor instruction set; and
    a condition specifier, coupled to said escape tag and being one of said accompanying parts, for prescribing a condition codes state, upon which performance of said extended operation depends, said condition codes state being provided to a conditional execution control logic, wherein said conditional execution control logic is configured to enable/disable performance of said extended operation.

24. The instruction set extension apparatus as recited in claim 23, wherein the remainder of said accompanying parts comprise a second opcode entity and an optional plurality of address specifier entities.

25. The instruction set extension apparatus as recited in claim 23, wherein said condition specifier comprises an 8-bit data entity.

26. The instruction set extension apparatus as recited in claim 23, wherein the existing microprocessor instruction set is the x86 microprocessor instruction set.

27. The instruction set extension apparatus as recited in claim 26, wherein said first opcode entity comprises the ICE BKPT opcode entity (i.e., opcode F1) in the x86 microprocessor instruction set.

28. The instruction set extension apparatus as recited in claim 23, wherein said translation logic translates said escape tag and said accompanying parts into corresponding micro instructions that direct extended execution logic to perform said extended operation.

29. The instruction set extension apparatus as recited in claim 28, wherein said conditional execution control logic evaluates a condition codes entity to determine if said condition codes state is true, and if said condition codes state is false, then said conditional execution control logic directs said extended execution logic to preclude performance of said extended operation.

30. The instruction set extension apparatus as recited in claim 23, wherein said translation logic comprises:

escape tag detection logic, for detecting said escape tag, and for directing that said accompanying parts be translated according to extended translation conventions; and decoding logic, coupled to said escape tag detection logic, for performing translation of microprocessor instructions according to conventions of the existing microprocessor instruction set, and for performing translation of said corresponding instruction according to said extended translation conventions to enable said extended operation.

31. A method for extending a microprocessor instruction set to provide programmable conditional execution capabilities, comprising:

providing an extended instruction, the extended instruction including an extended tag along with a condition specifier prefix, wherein the extended tag is one of the opcodes in the microprocessor instruction set;

prescribing, via the condition specifier prefix and remaining parts of the extended instruction, an operation to be executed, wherein execution of the operation depends upon realization of a condition specified by the condition specifier prefix; and evaluating condition code entities to determine whether or not the condition is realized and, if the condition is realized, executing the operation and, if the condition is not realized, precluding said executing.

32. The method as recited in claim 31, wherein said prescribing comprises:

first specifying the operation, said first specifying employing a different one of the opcodes in the microprocessor instruction set.

33. The method as recited in claim 31, wherein said providing comprises employing a condition specifier prefix that has a size of 8 bits.

34. The method as recited in claim 33, wherein said providing comprises using the one of the opcodes from the x86 microprocessor instruction set as the extended tag.

35. The method as recited in claim 34, wherein said using comprises selecting the x86 ICE BKPT opcode (i.e., opcode F1) as the extended tag.

36. The method as recited in claim 31, further comprising:

translating the extended instruction into micro instructions that direct extended execution logic to determine whether or not the condition is realized prior to executing the extended operation.

37. The method as recited in claim 36, wherein said translating comprises:

within translation logic, detecting the extended tag; and decoding the condition specifier prefix and the remaining parts of the extended instruction according to conditional execution translation rules.

* * * * *